(12) United States Patent
Wu et al.

(10) Patent No.: US 11,798,185 B2
(45) Date of Patent: Oct. 24, 2023

(54) IMAGE ANALYSIS SYSTEM AND IMAGE ANALYSIS METHOD FOR OBTAINING OBJECT RANGE

(71) Applicant: Winbond Electronics Corp., Taichung (TW)

(72) Inventors: Tung-Yu Wu, Yilan County (TW); Chun-Yen Liao, Taoyuan (TW); Chun-Sheng Wu, Taichung (TW); Kao-Tsair Tsai, Taichung (TW); Chao-Yi Huang, Taichung (TW)

(73) Assignee: WINBOND ELECTRONICS CORP., Taichung (TW)

( * ) Notice: Subject to any disclaimer, the term of this patent is extended or adjusted under 35 U.S.C. 154(b) by 196 days.

(21) Appl. No.: 17/209,741

(22) Filed: Mar. 23, 2021

(65) Prior Publication Data
US 2021/0304432 A1 Sep. 30, 2021

(30) Foreign Application Priority Data
Mar. 26, 2020 (TW) .................................. 109110218

(51) Int. Cl.
*G06T 7/60* (2017.01)
*G06T 7/11* (2017.01)
(Continued)

(52) U.S. Cl.
CPC ................. *G06T 7/60* (2013.01); *G06N 3/04* (2013.01); *G06N 3/08* (2013.01); *G06T 5/002* (2013.01);
(Continued)

(58) Field of Classification Search
CPC . G06N 3/045; G06T 2207/20021; G06T 7/11; G06T 7/60; G06T 2207/20084; G06T 5/002; G06T 7/73
See application file for complete search history.

(56) References Cited

U.S. PATENT DOCUMENTS 6,794,299 B1 9/2004 Markle et al.
2019/0266418 A1* 8/2019 Xu ..................... G06F 18/24143
(Continued)

FOREIGN PATENT DOCUMENTS

EP 1 494 171 A1 1/2005
EP 1494171 B1 * 11/2006 ............... G06K 9/00
KR 10-2006-0074537 A 7/2006

OTHER PUBLICATIONS

A Simple Single Seeded Region Growing Algorithm for Color ImageSegmentation using Adaptive Thresholding , 2011 International Conference on Communication Systems and Network Technologies (Year: 2011).*

(Continued)

*Primary Examiner* — Gandhi Thirugnanam
(74) *Attorney, Agent, or Firm* — Birch, Stewart, Kolasch & Birch, LLP (57) ABSTRACT

An image analysis method is provided. In the image analysis method, a to-be analyzed image is inputted into a region-based convolutional neural network (RCNN) model to obtain a masked image outputted from the RCNN. The center of a masked object in the masked image is calculated. The center is regarded as an origin of coordinate and the farthest coordinate point from the origin of coordinate in each of the four quadrants relative to the origin of coordinate are searched. The image analysis block is generated for each of the farthest coordinate points. The post-processing is performed on the image analysis blocks to obtain an object range.

6 Claims, 9 Drawing Sheets

(51) Int. Cl.
  *G06T 5/00* (2006.01)
  *G06T 7/73* (2017.01)
  *G06N 3/04* (2023.01)
  *G06N 3/08* (2023.01)

(52) U.S. Cl.
  CPC .................. *G06T 7/11* (2017.01); *G06T 7/73* (2017.01); *G06T 2207/10061* (2013.01); *G06T 2207/20021* (2013.01); *G06T 2207/20081* (2013.01); *G06T 2207/20084* (2013.01); *G06T 2207/30148* (2013.01)

(56) References Cited

U.S. PATENT DOCUMENTS

| | | | |
|---|---|---|---|
| 2020/0341466 A1* | 10/2020 | Pham | G06V 20/56 |
| 2021/0181086 A1* | 6/2021 | Chou | G01N 15/1484 |
| 2021/0201145 A1* | 7/2021 | Pham | G06N 3/08 |
| 2021/0304432 A1* | 9/2021 | Wu | G06N 3/08 |
| 2021/0397170 A1* | 12/2021 | Zhou | H01L 22/12 |
| 2022/0379917 A1* | 12/2022 | Henke | B60W 60/0011 |

OTHER PUBLICATIONS

Region-based Convolutional Networks for Accurate Object Detection and Segmentation, Ross Girshick, Jeff Donahue, Student Member, IEEE, Trevor Darrell, Member, IEEE, and Jitendra Malik, Fellow, IEEE, 0162-8828 _ 2015 IEEE (Year: 2015).*

* cited by examiner

IMAGE ANALYSIS SYSTEM AND IMAGE ANALYSIS METHOD FOR OBTAINING OBJECT RANGE

CROSS REFERENCE TO RELATED APPLICATIONS

This application claims priority of Taiwan Patent Application No. 109110218, filed on Mar. 26, 2020, the entirety of which is incorporated by reference herein.

BACKGROUND OF THE INVENTION

Field of the Invention

The present disclosure relates to an analysis system and an analysis method and, in particular, to an image analysis system and an image analysis method.

Description of the Related Art

Critical Dimension Scanning Electron Microscope (CD-SEM) is mainly used for online product line width measurement, which is characterized by the wafer not needing to go through pretreatment steps such as slicing or metal plating. Therefore, the patterns of photoresist, insulation layer and metal layer can be observed and measured. When users use CDSEM to measure critical dimensions, they must first build a recipe to let CDSEM know where to mark, how to measure, and other information. Measuring critical dimensions is also a part of image processing. CDSEM must be informed of the precise measurement area, direction, and value method. Otherwise, CDSEM cannot find the target in a large area of the image and obtain correct results. As such, pre-operation (construction process recipe or parameter) is very important but also time-consuming.

It can be seen that the pre-operation requires a lot of time. If the measurement position or object is changed, the recipe of the process needs to be reset. Moreover, when analyzing this grayscale image, if the initial black-and-white interlaced edges are different than expected, the whole batch of images will be measured incorrectly, so the error tolerance of image acquisition is quite low.

Therefore, existing methods described above still need to be improved further.

BRIEF SUMMARY OF THE INVENTION

In order to solve the above problems, the present disclosure provides an image analysis system. The image analysis system includes an image capturing device and a processor. The image capturing device is configured to capture a to-be analyzed image. The processor is configured to input the to-be analyzed image into a region-based convolutional neural network (RCNN) model; the region-based convolutional neural network model outputs a masked image; the processor calculates the center of the masked object in the masked image and regards the center as the origin of coordinate, searches for the farthest coordinate point from the origin of coordinate in each of the four quadrants relative to the origin of coordinate, generates an image analysis block for each of the farthest coordinate points, and performs post-processing on the image analysis blocks to obtain an object range.

In accordance with one feature of the present invention, the present disclosure provides an image analysis method. The image analysis method includes: inputting a to-be analyzed image into a region-based convolutional neural network (RCNN) model; outputting a masked image; calculating the center of the masked object in the masked image using the region-based convolutional neural network model; calculating the center of the masked object in the masked image; regarding the center as the origin of coordinate, searching for the farthest coordinate point from the origin of coordinate in each of the four quadrants relative to the origin of coordinate; generating an image analysis block for each of the farthest coordinate points; and performing post-processing on the image analysis blocks to obtain an object range.

The image analysis system and image analysis method shown in the present invention input a to-be analyzed image to a region-based convolutional neural network model, and generate a plurality of image analysis blocks based on the masked image output by the region-based convolutional neural network model. The processor performs post-processing on these image analysis blocks without having to post-process the entire masked image. It can obtain important critical points in the masked image, thus greatly reducing the amount of calculation. After the post-processing is completed, the processor can automatically analyze the critical points in these image analysis blocks. Through the positions of these critical points, the object range can be accurately obtained.

BRIEF DESCRIPTION OF THE DRAWINGS

In order to describe the manner in which the above-recited and other advantages and features of the disclosure can be obtained, a more particular description of the principles briefly described above will be rendered with reference to specific examples thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
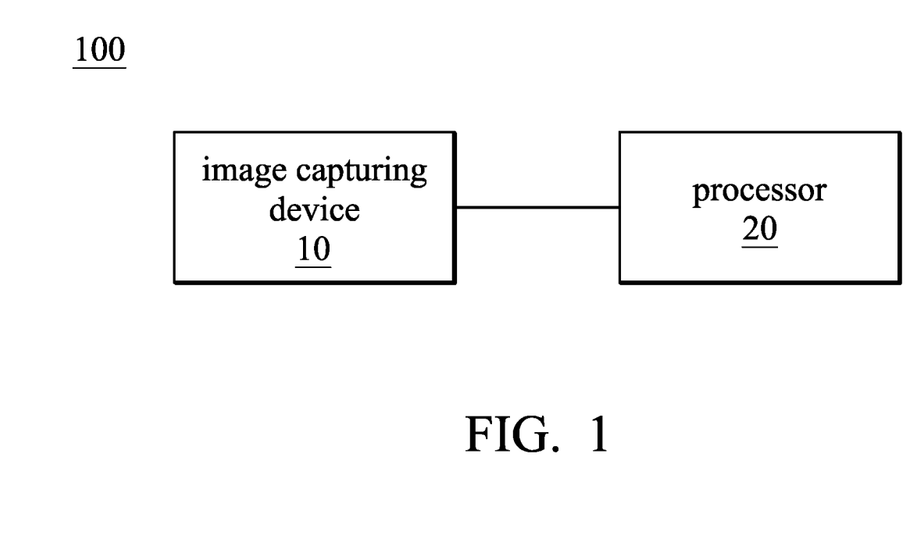
FIG. 1 is a schematic diagram of an image analysis system in accordance with one embodiment of the present disclosure.
Figure 2:
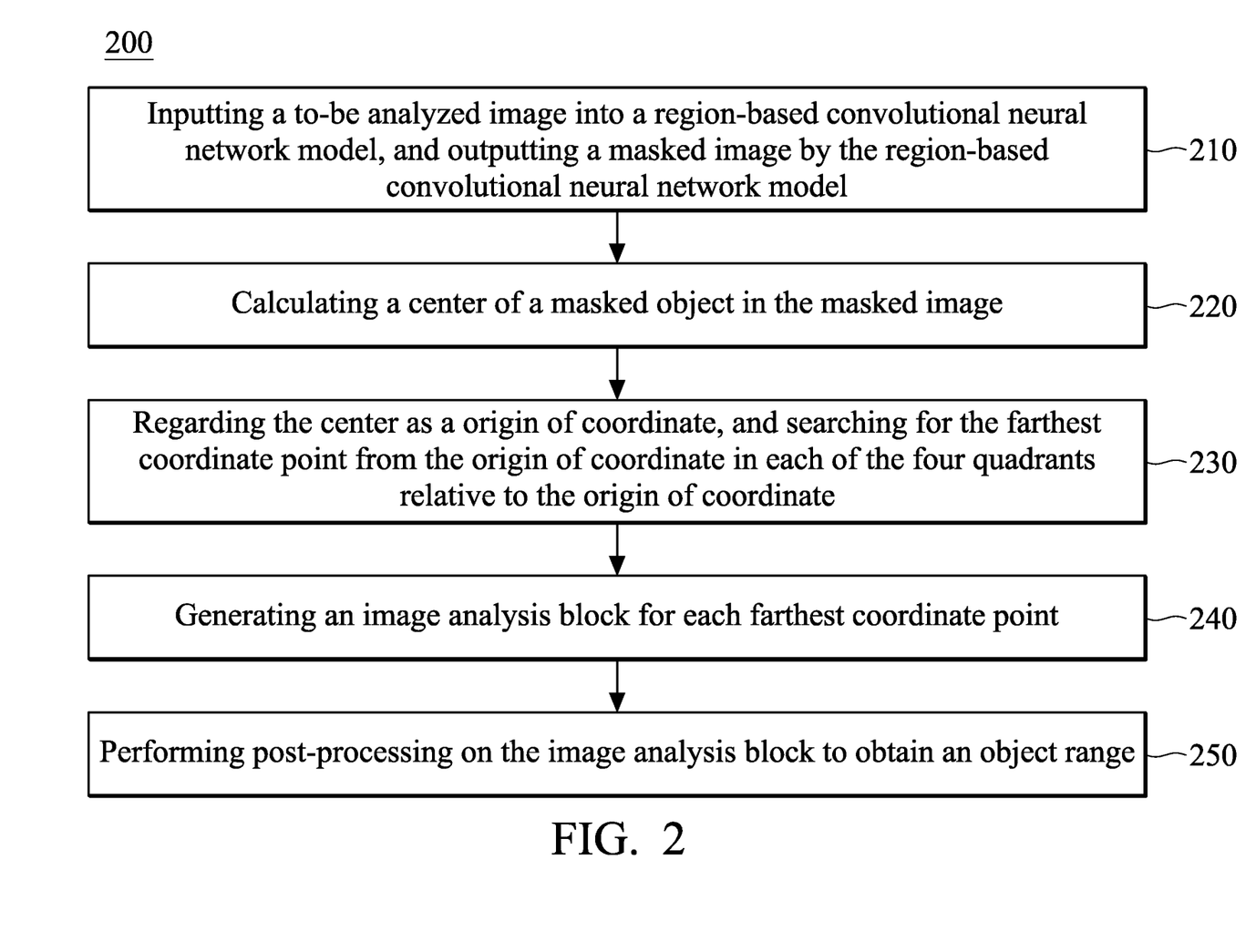
FIG. 2 is a schematic diagram of an image analysis method in accordance with one embodiment of the present disclosure.

Referring to FIGS. 1, 2 and 3A-3D, FIG. 1 is a schematic diagram of an image analysis system 100 in accordance with one embodiment of the present disclosure. FIG. 2 is a schematic diagram of an image analysis method 200 in accordance with one embodiment of the present disclosure. FIGS. 3A-3D are schematic diagrams of an image analysis method in accordance with one embodiment of the present disclosure.

As shown in FIG. 1, the image analysis system 100 includes an image capturing device 10 and a processor 20. The image capturing device 10 and the processor 20 are coupled in a wired/wireless manner. In one embodiment, the image capturing device 10 is configured to capture a to-be analyzed image, such as a semiconductor image. In one embodiment, the image capturing device is a scanning electron microscope (SEM). An image of the sample surface could be produced by the scanning electron microscope by scanning the surface of the sample with a focused electron beam.

In an embodiment, the processor 20 may be implemented by an integrated circuit such as a micro controller, a microprocessor, a digital signal processor, an application specific integrated circuit (ASIC), or a logic circuit.

The following describes an image analysis method 200 for accurately and automatically marking an object range Ra (for example, one or more layers of a semiconductor profile) in a to-be analyzed image. In one embodiment, the unit of object range Ra is expressed in nanometers (nm).

In step 210, the processor 20 inputs a to-be analyzed image into a region-based convolutional neural network (RCNN) model, and the region-based convolutional neural network model outputs a masked image.

Figure 3A:
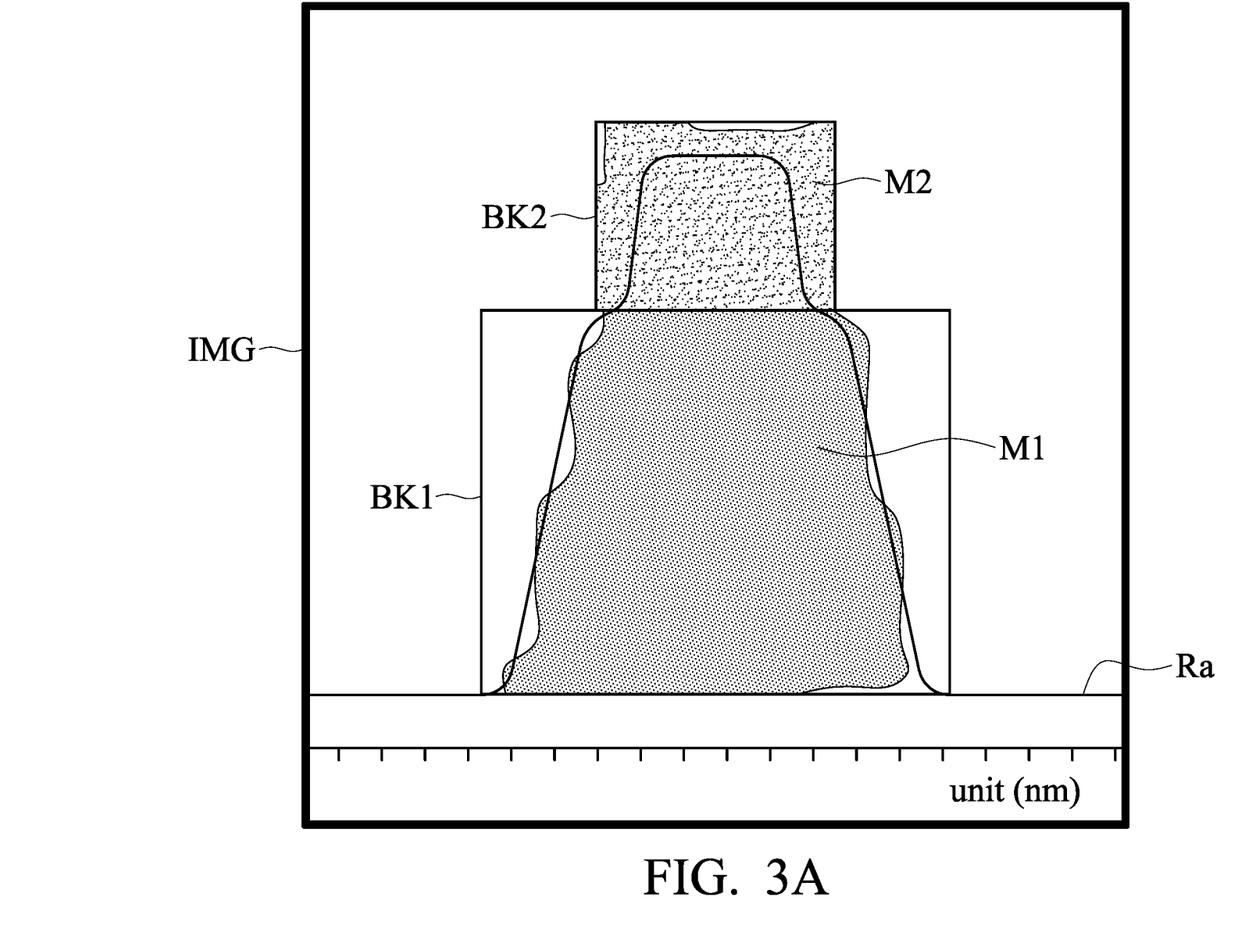
FIGS. 3A-3D are schematic diagrams of an image analysis method in accordance with one embodiment of the present disclosure.

In an embodiment, as shown in FIG. 3A, the to-be analyzed image is, for example, a semiconductor image captured by the image capturing device 10. In general, semiconductor images include multilayer structures, and many semiconductors include a pyramidal cross-sectional shape. For example, block BK1 is a photoresist layer or a metal layer. The block BK2 above the block BK1 is an oxide layer or a photoresist layer. For convenience of explanation, the embodiments take the block BK1 and the block BK2 as examples for illustration.

In one embodiment, the training process of the region-based convolutional neural network model is as follows. First, a large amount of labeled image data (for example, for marking each layer of a semiconductor profile) is given to the region-based convolutional neural network model. The region-based convolutional neural network model will firstly extract the features of these labeled images, and then through the simulation of possible object areas (such as each layer of the semiconductor profile), determine the areas where objects are more likely to appear, and the features are combined into the characteristic spectrum of the object, and the characteristic spectrum information is calculated to obtain the probability of the object type and the possible location of the object. The characteristic spectrum is recombined, and the contours of the objects is tried to be restored by using neurons. These steps can be repeated to train the region-based convolutional neural network model. After the region-based convolutional neural network model is trained and the image is input, the corresponding object position, contour, and type can be obtained. Since the region-based convolutional neural network model is a known algorithm, it will not be repeated here.

In one embodiment, after the regional convolutional neural network model is trained, the processor 20 inputs the to-be analyzed image into the regional convolutional neural network model. As shown in FIG. 3A, the regional convolutional neural network model outputs a masked image IMG. The masked image IMG includes a masked object M1 and a masked object M2.

In one embodiment, the masked image IMG further includes an outer frame BK1 of the masked object M1 and an outer frame BK2 of the masked object M2. The outer frame BK1 is generated by the regional convolutional neural network model based on the highest point pixel, the rightmost pixel, the leftmost pixel, and the lowest point pixel of the masked object M1. The outer frame BK2 is generated by the regional convolutional neural network model according to the highest point pixel, the rightmost pixel, the leftmost pixel, and the lowest point pixel of the masking object M2.

In step 220, the processor 20 calculates a center (for example, the center P1) of a masked object (for example, the masked object M1) in the masked image IMG.

Figure 3B:
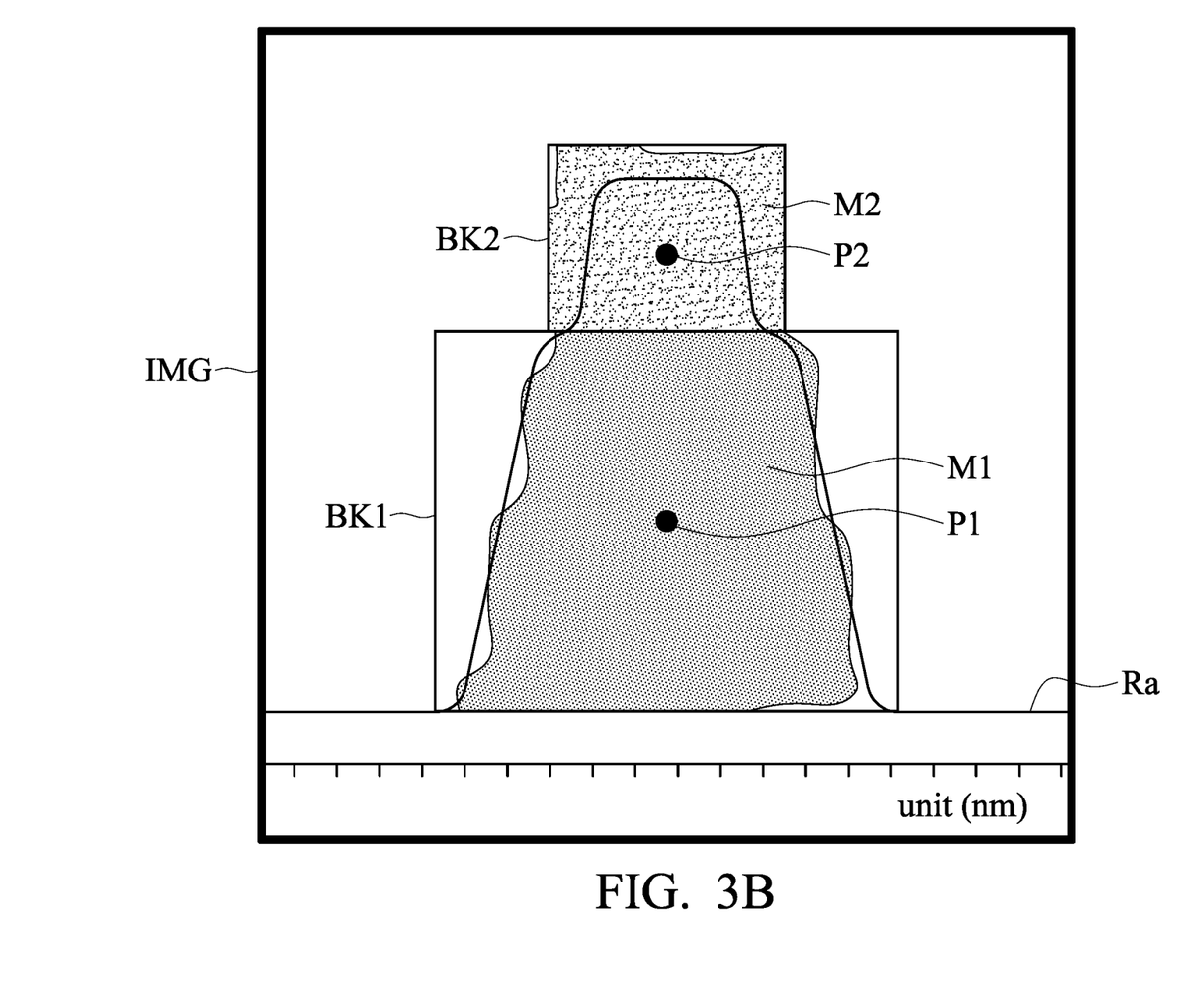

In an embodiment, as shown in FIG. 3B, the processor 20 can treat the unmasked part of the masked image IMG as "0" and the masked part of the masked image IMG as "1". The processor 20 calculates the center P1 of the masked object M1 according to the coordinates of each pixel point in the masked object M1. For example, the lower left corner of the masked image IMG is regarded as the origin of coordinate, and the masked object M1 (that is, X and Y values of all pixels in the masked part regarded as "1") are added up and then averaged. The center P2 of the masked object M2 can also be calculated by the same method. However, the method of calculating the respective centers P1 and P2 of the masked objects M1 and M2 is not limited thereto, and it is only an exemplary method of calculating the centers P1 and P2.

In step 230, the processor 20 regards the center (for example, the center P1) as a origin of coordinate, and searches for the farthest coordinate point from the origin of coordinate in each of the four quadrants relative to the origin of coordinate.

Figure 3C:
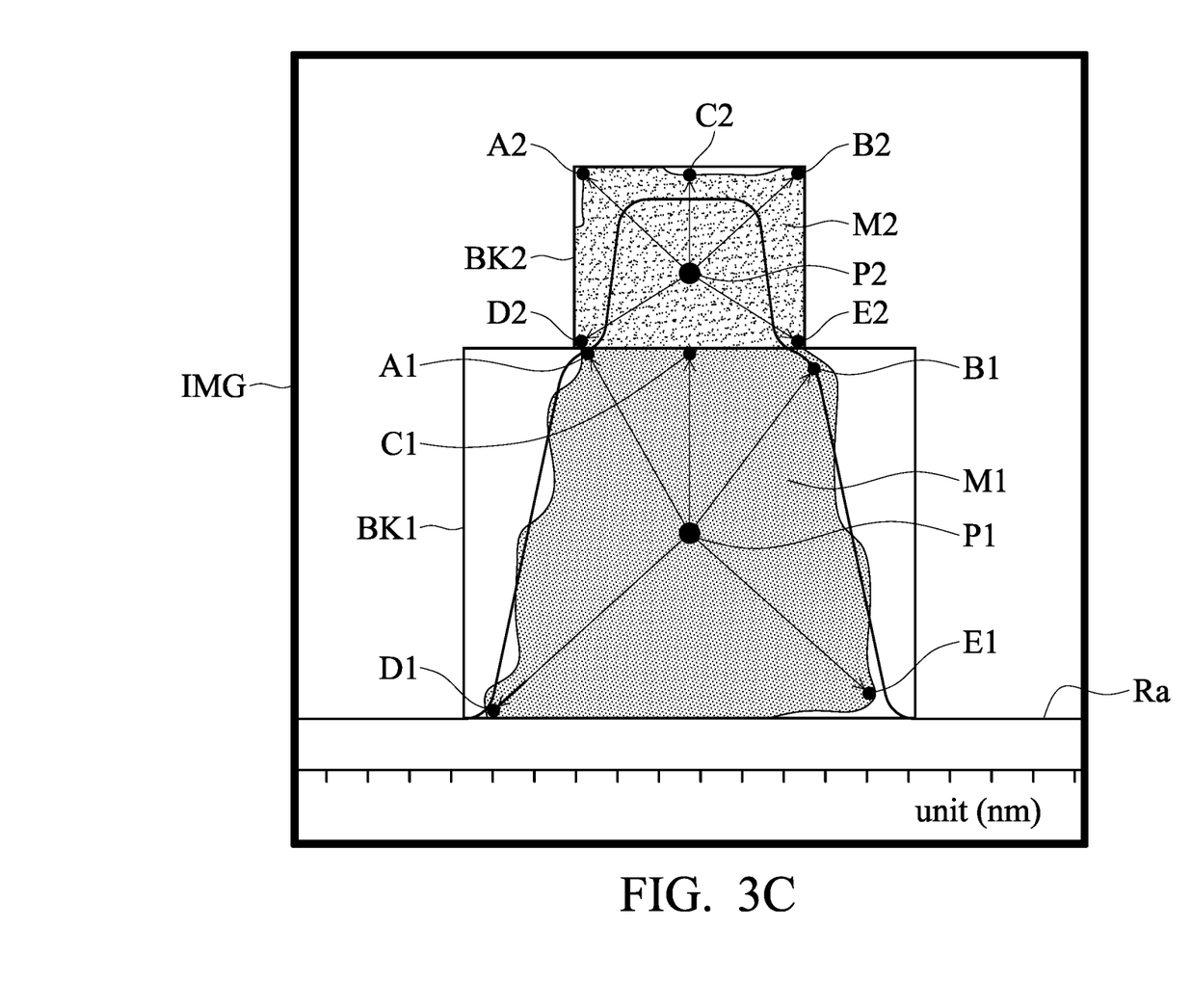

In one embodiment, as shown in FIG. 3C, the processor 20 regards the center P1 as the origin of coordinate, and searches for the farthest coordinate point from the origin of coordinate in each of the four quadrants relative to the origin of coordinate. The farthest coordinate point refers to the farthest coordinate point from the origin of coordinate in the four quadrants relative to the origin of coordinate in the range of the masked object M1. For example, in the first quadrant, the farthest coordinate point from the origin of coordinate in the range of the masked object M1 is the coordinate B1. For example, in the second quadrant, the farthest coordinate point from the origin of coordinate in the range of the masked object M1 is the coordinate A1. For example, in the third quadrant, the farthest coordinate point from the origin of coordinate in the range of the masked object M1 is the coordinate D1. For example, in the fourth quadrant, the farthest coordinate point from the origin of coordinate in the range of the masked object M1 is the coordinate E1. The processor 20 calculates the center point of the coordinate B1 and the coordinate A1, and regards this center point as the coordinate C1. The coordinate C1 can be applied to be the height of the subsequent masked object M1.

Figure 3D:
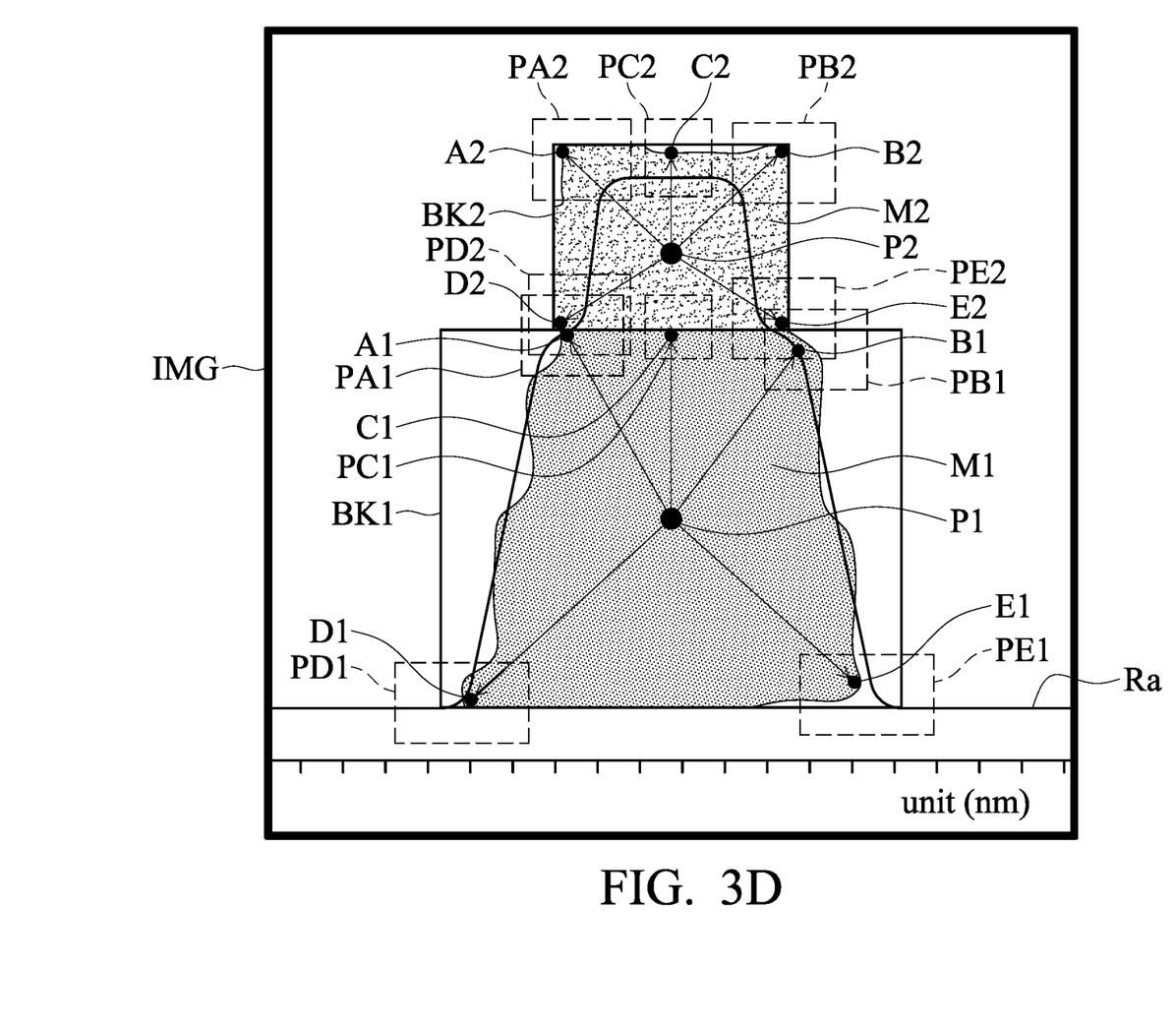

In an embodiment, as shown in 3D, the processor 20 regards the center P2 as the origin of coordinate, and searches for the farthest coordinate point from the origin of coordinate in each of the four quadrants relative to the origin of coordinate. The farthest coordinate point refers to the farthest coordinate point from the origin of coordinate in the four quadrants relative to the origin of coordinate in the range of the masked object M2. For example, in the first quadrant, the farthest coordinate point from the origin of coordinate in the range of the masked object M2 is the coordinate B2. For example, in the second quadrant, the farthest coordinate point from the origin of coordinate in the range of the masked object M2 is the coordinate A2. For example, in the third quadrant, the farthest coordinate point from the origin of coordinate in the range of the masked object M2 is the coordinate D2. For example, in the fourth quadrant, the farthest coordinate point from the origin of coordinate in the range of the masked object M2 is the coordinate E2. The processor 20 calculates the center point of the coordinate B2 and the coordinate A2, and regards this center point as the coordinate C2 and one of the farthest coordinate points. The coordinate C2 can be applied to the subsequent estimation of the height of the masked object M2.

Since the processing method of the masked object M2 is similar to the processing method of the masked object M1, the masked object M1 is used as an explanation later.

In step 240, the processor 20 generates an image analysis block for each farthest coordinate point.

In one embodiment, as shown in FIG. 3D, for the masked object M1, the processor 20 generates an image analysis block (for example, PA1, PB1, PC1, PD1, and PE1) respectively for each farthest coordinate point (for example, coordinates A1, B1, C1, D1, and E1).

In one embodiment, the relative positions of the farthest coordinate points A1, B1, C1, D1, and E1 can be used to rotate the masked image IMG. For example, the processor 20 can calculate that the line connection of the farthest coordinate points A1 and B1 is substantially parallel to the line connection of the farthest coordinate points D1 and E1. When the processor 20 determines that the two connections are not horizontal, the entire masked image IMG can be rotated to make the two connections approach a horizontal state, thereby correcting the masked image IMG.

Figure 4:
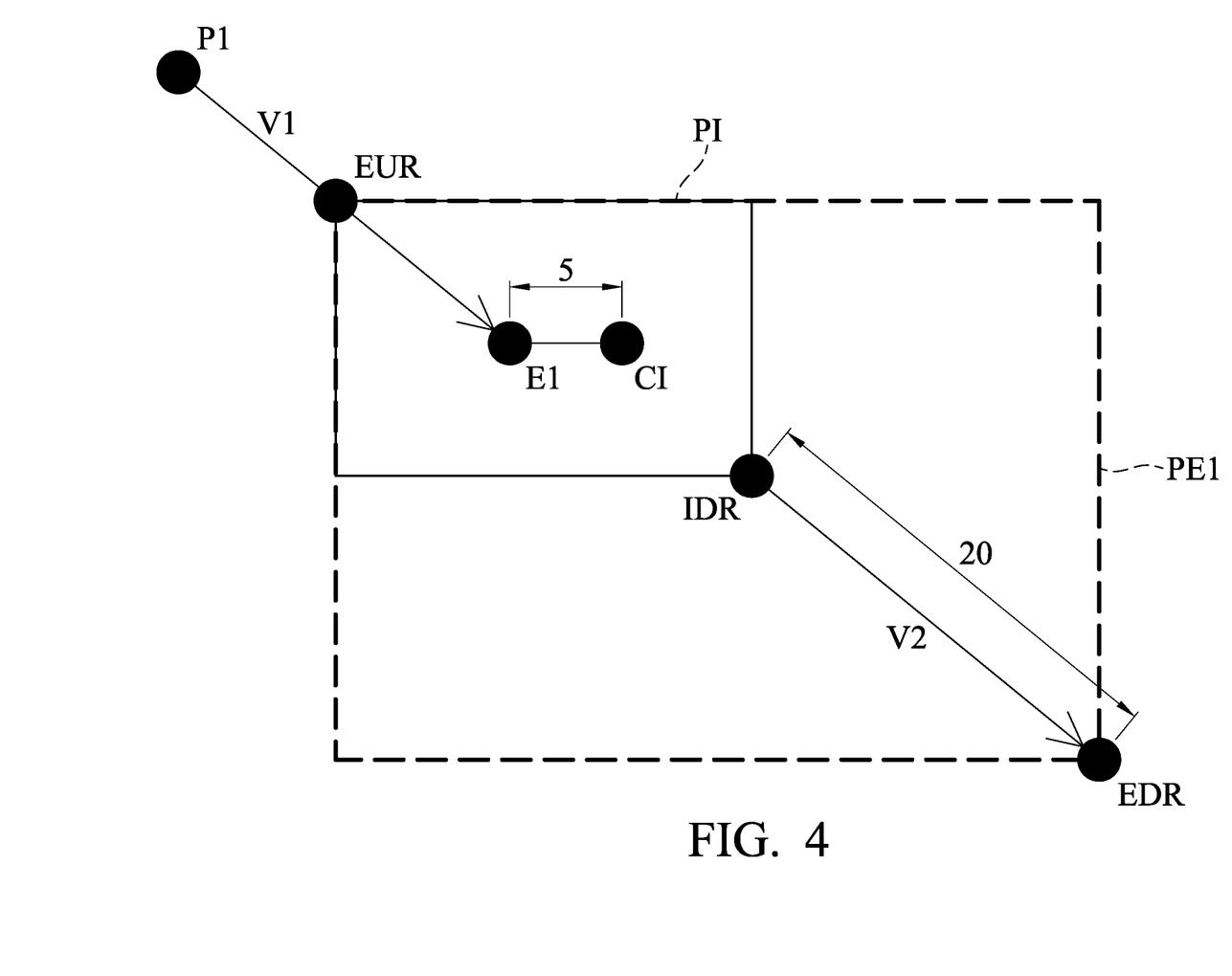
FIG. 4 is a schematic diagram of a method for generating an image analysis block PE1 in accordance with one embodiment of the present disclosure.

In one embodiment, the image analysis blocks PA1, PB1, PC1, PD1, and PE1 are extrapolated to the outside of the masked object M1, so as to include the corners of the object range Ra as much as possible. For example, please refer to FIG. 4. FIG. 4 is a schematic diagram of a method for generating an image analysis block PE1 in accordance with one embodiment of the present disclosure. The masked range of the masked object M1 may not cover the corner of the object range Ra accurately, in other words, the masked object M1 may not be masked to the object range Ra, or may be masked to exceed the object range Ra, due to shaky edges at the corners. This will cause the object range Ra cannot be accurately positioned. Therefore, the detailed analysis needs to be performed for each of the farthest coordinate points A1, B1, C1, D1, and E1 (all located at the boundary or corner of the masked object M1) with their corresponding image analysis blocks PA1, PB1, PC1, PD1, and PE1. In this way, the object range Ra can be more accurately analyzed.

In FIG. 4, the farthest coordinate point E1 is taken as an example. Since the farthest coordinate point E1 is located at the lower right part of the masked object M1, when the processor 20 generates the image analysis block PE1, it needs to confirm that the farthest coordinate point E1 should be in the image analysis block PE1, and the image analysis block PE1 should also be pushed downward to the right for a little bit, so as to try to include the lower right corner of the object range Ra.

More specifically, the processor 20 first calculates a vector V1 (that is, including directivity) from the center P1 to the farthest coordinate point E1, calculates a coordinate CI from the farthest coordinate point E1 to the right to a preset pixel value (for example, 5), and uses the coordinate CI as the center point of the image analysis block PE1. In this way, an initial analysis block PI that is skewed to the right relative to the farthest coordinate point E1 can be generated. The length and width of the initial analysis block PI are a preset value (for example, 10 pixels in length and 20 pixels in width). Next, obtain the coordinate IDR in the lower right corner of the initial analysis block PI, and extend another preset pixel value (for example, 20) from the coordinate IDR according to the direction of the vector V2 to find the coordinate EDR. The vector V2 is parallel to the vector V1. The image analysis block PE1 can be drawn based on the upper left coordinate EUR and the coordinate EDR of the initial analysis block PI. In this way, the image analysis block PE1 can be pushed to the lower right of the farthest coordinate point E1 and then pushed outward a little bit, so as to try to include the lower right corner of the object range Ra. However, the manner of defining the image analysis block PE1 is not limited thereto. And, here is only one embodiment. In addition, the image analysis blocks PA1, PB1, PC1, and PD1 can also be generated in this way, so they will not be described in detail here.

In the above manner, as shown in FIG. 3D, the processor 20 can generate image analysis blocks PA1, PB1, PC1, PD1, and PE1 corresponding to the masked object M1. In the same manner, the processor 20 can also generate image analysis blocks PA2, PB2, PC2, PD2, and PE2 corresponding to the masked object M2.

In step 250, the processor 20 performs post-processing on the image analysis block to obtain an object range Ra.

In one embodiment, please refer to FIGS. 5A to 5F. FIGS. 5A to 5F are schematic diagrams of a post-processing method in accordance with one embodiment of the present disclosure. Since the post-processing method can be applied to each image analysis block (such as PA1, PB1, PC1, PD1, PE1, PA2, PB2, PC2, PD2, and PE2), after performing post-process on these image analysis blocks, each corner of the object can be obtained. In this way, the object range Ra is accurately defined. The image analysis block PE1 is taken as an example below for illustration.

Figure 5A:
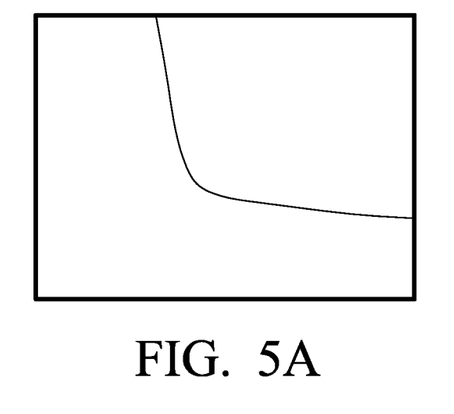
FIGS. 5A-5F are schematic diagrams of a post-processing method in accordance with one embodiment of the present disclosure.

In an embodiment, as shown in FIG. 5A, the processor 20 is further configured to perform a smoothing process on the current analysis block (such as the image analysis block PE1) while performing the post-processing. Smoothing process can remove image noise. In one embodiment, the smoothing process can use existing algorithms such as domain averaging, low-pass filtering, and multi-image averaging.

Figure 5B:
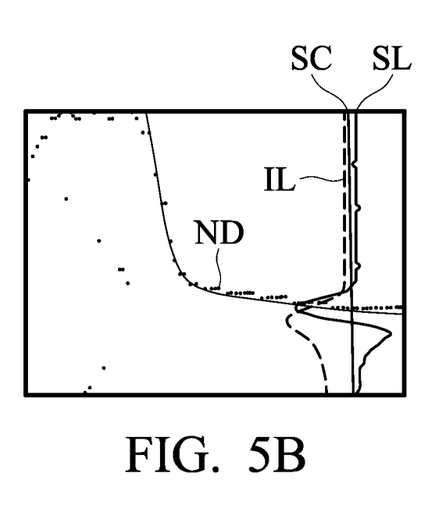

In one embodiment, as shown in FIG. 5B, after the processor 20 performs smoothing post-process on the image analysis block PE1, the processor 20 vertically scans each pixel of the image analysis block PE1. When the processor 20 scans the pixel column SC of the image analysis block PE1 vertically, the processor 20 calculates the respective pixel intensity of all the pixels in the pixel column SC. These pixel intensities form a first pixel curve IL, and the processor 20 calculates the slope of the first pixel curve IL to obtain a first slope curve SL. The processor 20 marks the maximum value of the first slope curve SL as a mark point ND. The processor 20 vertically scans all the pixel columns of the image analysis block PE1, and thus calculates many marked points ND (that is, the dots on FIG. 5B are all marked points ND).

Figure 5C:
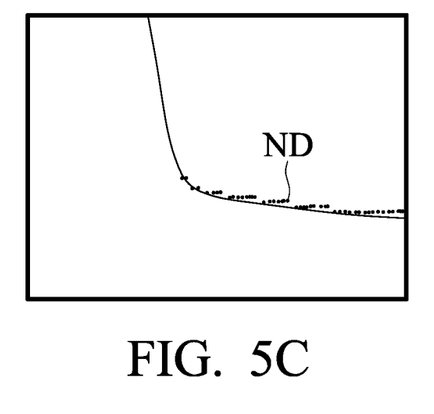
Figure 5D:
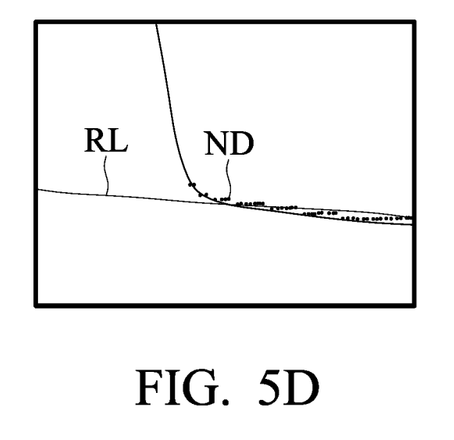

In one embodiment, the processor 20 vertically scans each pixel of the image analysis block PE1 to obtain a plurality of marked points ND. The processor 20 calculates the average intensity value that corresponds to the marked points ND. For example, the gray levels of these marked points ND are added to obtain an average intensity value. And, the processor 20 multiply the average intensity value by a parameter (for example, 0.8) to obtain a threshold value. After filtering the marked points whose pixel intensity is lower than the threshold value (as shown in FIG. 5C, each in FIG. 5C), the remaining marked points ND are substituted into a linear regression algorithm to obtain a regression line segment RL (as shown in FIG. 5D).

Figure 5E:
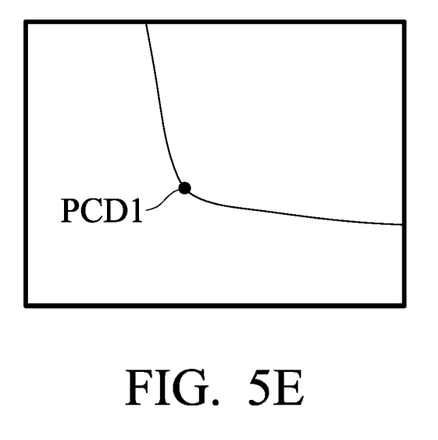

In one embodiment, the processor 20 is further configured to scan each pixel of the regression line segment RL vertically. When the processor 20 scans a second pixel column of the regression line segment vertically, the processor 20 calculates a second pixel intensity of each pixel in the second pixel column. These second pixel intensities form a second pixel curve. The processor 20 calculates the slope of the second pixel curve to obtain a second slope curve. The coordinates of the maximum value of the second slope curve are regarded as the critical point PCD1 (as shown in FIG. 5E).

Figure 5F:
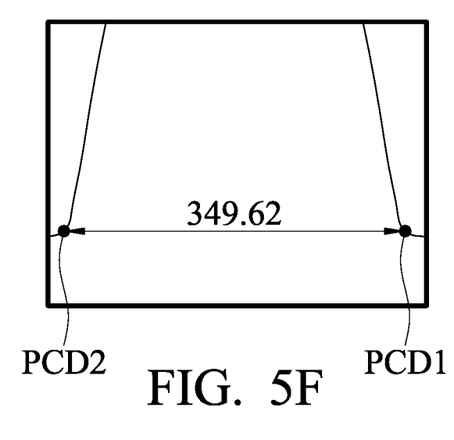

In one embodiment, the processor 20 calculates the critical point PCD2 (as shown in FIG. 5F) and calculates the distance between the critical point PCD1 and the critical point PCD2 to obtain a critical dimension. The critical dimension is 349.62 nm. This critical dimension is a bottom critical dimension. In one embodiment, the calculation method of critical point PCD2 is the same as critical point PCD1, and critical point PCD2 is located in image analysis block PD1.

In one embodiment, the calculation method of critical point PCD3 and PCD4 is the same as that of critical point PCD1, critical point PCD3 is located in image analysis block PA1, and critical point PCD4 is located in image analysis block PB1.

Figure 6:
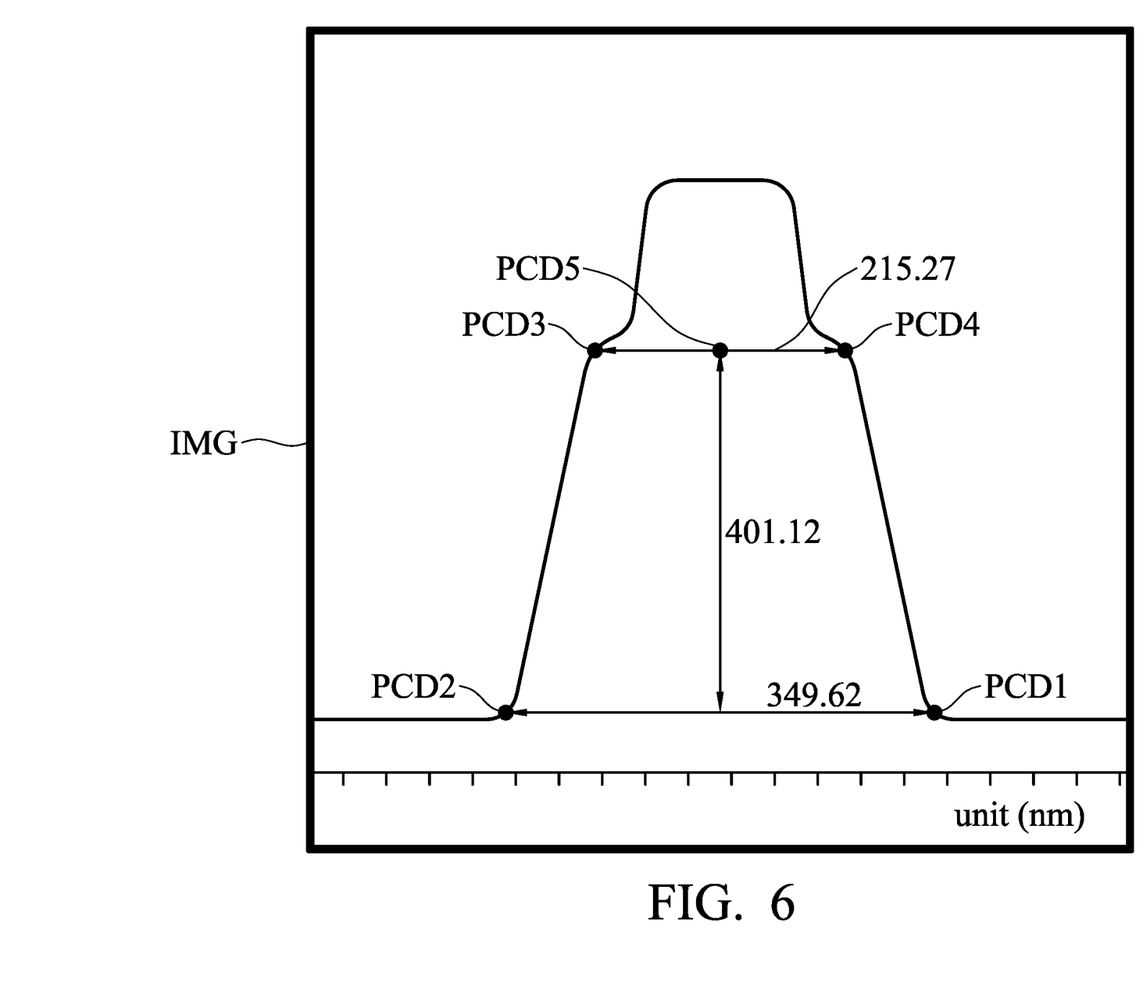
FIG. 6 is a schematic diagram of an image analysis method in accordance with one embodiment of the present disclosure.

In one embodiment, please refer to FIG. 6. FIG. 6 is a schematic diagram of an image analysis method in accordance with one embodiment of the present disclosure. The processor 20 calculates a plurality of critical points PCD1 to PCD5. These critical points are vertices of the whole or a part of the object range Ra, for example, a lower right corner (critical point PCD1), a lower left corner (critical point PCD2), an upper left corner (critical point PCD3), and an upper right corner (critical point PCD4) of the object range Ra in the block BK1. In this example, the processor 20 calculates an intermediate position between the critical point PCD4 corresponding to the upper right corner and the critical point PCD3 corresponding to the upper left corner, and regards this intermediate position as the critical point PCD5. The processor 20 considers the distance between the intermediate position (critical point PCD5) and a bottom critical dimension (that is, the line between critical point PCD1 and critical point PCD2) as a height (for example, 401.12 nm).

In one embodiment, the processor 20 calculates the distance between the critical point PCD3 and the critical point PCD4 to obtain the critical dimension. The critical dimension is, for example, 215.27 nanometers. This critical dimension is a top critical dimension.

It can be known from the above that the processor 20 connects the critical point PCD4 corresponding to the upper right corner and the critical point PCD3 corresponding to the upper left corner to obtain the top critical dimension. The processor 20 connects the critical point PCD1 corresponding to the lower right corner and the critical point PCD2 corresponding to the lower left corner to obtain a bottom critical dimension. The processor 20 calculates the distance between the critical point PCD5 and the critical point PCD1 and the critical point PCD2 to obtain the height. Therefore, the processor 20 can calculate a plurality of critical dimensions. These critical dimensions include the top critical dimension, bottom critical dimension, and height. The processor 20 obtains the object range Ra accurately according to these critical dimensions.

The image analysis system and image analysis method shown in the present invention input a to-be analyzed image to a region-based convolutional neural network model, and generate a plurality of image analysis blocks based on the masked image output by the region-based convolutional neural network model. The processor performs post-processing on these image analysis blocks without having to post-process the entire masked image. It can obtain important critical points in the masked image, thus greatly reducing the amount of calculation. After the post-processing is completed, the processor can automatically analyze the critical points in these image analysis blocks. Through the positions of these critical points, the object range can be accurately obtained.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An image analysis system, comprising:
   an image capturing device, configured to capture a to-be analyzed image; and
   a processor, configured to input the to-be analyzed image into a region-based convolutional neural network (RCNN) model; the region-based convolutional neural network model outputs a masked image; the processor calculates a center of a masked object in the masked image and regards the center as a origin of coordinate, searches for a farthest coordinate point from the origin of coordinate in each of the four quadrants relative to the origin of coordinate, generates an image analysis block for each of the farthest coordinate points, and performs post-processing on the image analysis blocks to obtain an object range;
   wherein each of the image analysis blocks comprises a current analysis block, and the processor is further configured to perform a smoothing process on the current analysis block while performing the post-processing;
   wherein the processor is further configured to vertically scan each pixel of each of the current analysis blocks while performing the post-processing, when the processor scans a first pixel column of the current analysis block vertically, the processor calculates a first pixel intensity for each pixel in the first pixel column, the first pixel intensities form a first pixel curve, the processor calculates the slope of the first pixel curve to obtain a first slope curve, the processor marks the maximum value of the first slope curve as a marking point the processor is further configured to scan each pixel of the current analysis block vertically to obtain a plurality of marked points, calculate an average intensity value corresponding to the marked points, and multiply the average intensity value by a parameter to obtain a threshold value, after filtering the marked points whose pixel intensity is lower than the threshold value, the remaining marked points are substituted into a linear regression algorithm to obtain a regression line segment.

2. The image analysis system of claim 1, wherein the processor is further configured to scan each pixel of the regression line segment vertically, when the processor scans a second pixel column of the regression line segment vertically, calculates a second pixel intensity of each pixel in the second pixel column, the second pixel intensities form a second pixel curve, and the slope of the second pixel curve is calculated to obtain a second slope curve, and the coordinate of the maximum value of the second slope curve is regarded as a first critical point; wherein the processor is further configured to calculate a second critical point and calculate a distance between the first critical point and the second critical point to obtain a critical dimension.

3. The image analysis system of claim 2, wherein the processor is further used to calculate a plurality of critical points, the critical points are a lower right corner, a lower left corner, an upper left corner, and an upper right corner of the object range, the processor calculates an intermediate position between the critical point corresponding to the upper right corner and the critical point corresponding to the lower left corner, and regards the distance between the intermediate position and a bottom critical measurement as a height, and the processor is used to calculate a plurality of critical measurements, the critical measurements comprise an upper critical measurement, a bottom critical measurement, and the height, the processor obtains the object range according to the critical measurements, the processor connects the critical point corresponding to the upper right corner with the critical point corresponding to the upper left corner to obtain the upper critical measurement, and the processor connects the critical point corresponding to the lower right corner with the critical point corresponding to the lower left corner to obtain the lower critical measurement.

4. An image analysis method, comprising:
inputting a to-be analyzed image into a region-based convolutional neural network (RCNN) model; the region-based convolutional neural network model outputs a masked image;
calculating the center of a masked object in the masked image;
regarding the center as a origin of coordinate, searching for the farthest coordinate point from the origin of coordinate in each of the four quadrants relative to the origin of coordinate;
generating an image analysis block for each of the farthest coordinate points; and
performing post-processing on the image analysis blocks to obtain an object range, wherein each of the image analysis blocks comprises a current analysis block;
performing a smoothing process on the current analysis block while performing the post-processing;
wherein after the step of performing a smoothing process on the current analysis block, the image analysis method further comprising:
vertically scanning each pixel of each current analysis block, wherein the first pixel intensities form a first pixel curve, when a processor scans the first pixel column of the current analysis block vertically and calculates the first pixel intensity of each pixel in the first pixel column;
calculating the slope of the first pixel curve to obtain a first slope curve,
marking the maximum value of the first slope curve as a marking point;
scanning each pixel of the current analysis block vertically to obtain a plurality of marked points;
calculating the average intensity value that corresponds to the marked points;
multiplying the average intensity value by a parameter to obtain a threshold value; and
after filtering the marked points whose pixel intensity is lower than the threshold value, the remaining marked points are substituted into a linear regression algorithm to obtain a regression line segment.

5. The image analysis method of claim 4, further comprising:
scanning each pixel of the regression line segment vertically;
when the processor scans a second pixel column of the regression line segment vertically and calculates a second pixel intensity of each pixel in the second pixel column, the second pixel intensities form a second pixel curve;
calculating the slope of the second pixel curve to obtain a second slope curve; regarding the coordinate of the maximum value of the second slope curve as a first critical point; and
calculating a second critical point and calculating the distance between the first critical point and the second critical point to obtain a critical dimension.

6. The image analysis method of claim 5, further comprising:
calculating a plurality of critical points, wherein the critical points are a lower right corner, a lower left corner, an upper left corner, and an upper right corner of the object range;
calculating an intermediate position between the critical point corresponding to the upper right corner and the critical point corresponding to the lower left corner, and regards the distance between the intermediate position and a bottom critical dimension as a height;
calculating a plurality of critical dimensions;
wherein the critical dimensions comprise an upper critical dimension, a bottom critical dimension, and the height, the processor obtains the object range according to the critical dimensions;
connecting the critical point corresponding to the upper right corner with the critical point corresponding to the upper left corner to obtain the upper critical measurement, and
connecting the critical point corresponding to the lower right corner with the critical point corresponding to the lower left corner to obtain the lower critical dimension.

* * * * *